(12) United States Patent
Caudle

(10) Patent No.: US 7,018,099 B2
(45) Date of Patent: Mar. 28, 2006

(54) CONTOURED POUCH HAVING A ZIGZAG SHAPE

(75) Inventor: Timothy G. Caudle, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 114 days.

(21) Appl. No.: 10/442,787

(22) Filed: May 21, 2003

(65) Prior Publication Data
US 2004/0234174 A1 Nov. 25, 2004

(51) Int. Cl.
B65D 30/16 (2006.01)

(52) U.S. Cl. .................. 383/104; 383/107; 383/200; 383/906; 383/907

(58) Field of Classification Search ............... 383/107, 383/104, 906, 907, 200
See application file for complete search history.

(56) References Cited

U.S. PATENT DOCUMENTS

| | | | |
|---|---|---|---|
| 3,009,498 A * | 11/1961 | Matthias | 383/44 |
| 3,448,915 A | 6/1969 | Schwarzkopf | |
| 4,216,639 A * | 8/1980 | Gautier | 53/413 |
| 4,361,235 A * | 11/1982 | Gautier | 206/527 |
| 4,910,147 A * | 3/1990 | Bacehowski et al. | 435/304.1 |
| 5,800,062 A * | 9/1998 | Tobolka | 383/104 |
| 5,971,613 A | 10/1999 | Bell | |
| D430,794 S | 9/2000 | Parent-Inch | |
| 6,145,282 A | 11/2000 | Tsuruta | |
| 6,164,825 A | 12/2000 | Larkin et al. | |
| 6,224,528 B1 | 5/2001 | Bell | |
| 6,244,747 B1 | 6/2001 | Caudle | |
| 6,293,073 B1 | 9/2001 | Caudle | |
| 6,341,895 B1 | 1/2002 | Tani | |
| D466,003 S | 11/2002 | Jones et al. | |
| 6,485,177 B1 | 11/2002 | Bell | |
| 2002/0126921 A1 | 9/2002 | Bell | |

FOREIGN PATENT DOCUMENTS

| | | |
|---|---|---|
| EP | 0 917 946 A2 | 5/1999 |
| FR | 1 327 875 A | 9/1963 |
| GB | 870 180 A | 6/1961 |

OTHER PUBLICATIONS

Copy of International Search Report for PCT Application No. PCT/US2004/015769; Filed May 20, 2004; Date of Completion Nov. 3, 2004; Date of Mailing Nov. 15, 2004.

* cited by examiner

Primary Examiner—Jes F. Pascua
(74) Attorney, Agent, or Firm—Alston & Bird LLP (57) ABSTRACT

Zigzag-shaped pouches are formed from flexible web material by positioning two portions of the web material in overlying relation and sealing them together along top, bottom, and opposite side edges of the pouch. The side edges of the pouch are made up of a plurality of linear segments connected end-to-end and alternately inclined in opposite directions to form a zigzag-shaped edge. Each linear segment of one edge is substantially parallel to a corresponding segment of the opposite edge, such that the two edges are substantially complementary in shape, whereby the pouch as a whole has a zigzag shape.

8 Claims, 8 Drawing Sheets

CONTOURED POUCH HAVING A ZIGZAG SHAPE

FIELD OF THE INVENTION

The present invention relates to sealed pouches, and apparatus and processes for producing the same. In particular, the present invention relates to sealed pouches having contoured edges and a pour spout, and apparatus and processes for producing the same from one or more films, laminates, or web materials.

BACKGROUND OF THE INVENTION

Pouches made from films or laminates, including polymers such as polyethylene or polypropylene, have found use in a variety of applications. For example, such pouches are used to hold low-viscosity fluids (e.g., juice and soda), high-viscosity fluids (e.g., condiments and sauces), fluid/solid mixtures (e.g., soups), gels, powders, and pulverulent materials. The benefit of such pouches resides, at least in part, in the fact that such pouches are easy to store prior to filling and produce very little waste when discarded. The pouches can be formed into a variety of sizes and shapes. One type of pouch is designed to lie on a supporting surface and is generally known as a pillow-type pouch. Alternatively, a pouch can include a base that permits the pouch to maintain an upright configuration, generally known as a stand-up pouch.

Pouches can be assembled from flexible films, laminates, or web materials using form-fill-seal machines. Such machines receive the film, laminate, or web material and manipulate the material to form the desired shape. For example, one or more films, laminates, and/or web materials can be folded and oriented to produce the desired shape. Once formed, the edges of the pouch are sealed and the pouch filled. Typically, the film, laminate, or web material has at least one heat seal layer or adhesive surface which enables the edges to be sealed by the application of heat. During the sealing process, a portion of at least one edge of the pouch is left unsealed until after the pouch is filled. The pouch is filled through the unsealed portion and the unsealed portion is then sealed. Alternatively, the pouch can be filled and the unsealed portion simultaneously closed in order to provide a sealed pouch with minimal headspace.

Although a variety of pouches have been previously described, none of the known pouches provides ergonomically contoured edges yet can be manufactured on form-fill-seal machines without generating appreciable, and preferably without generating any, scrap material between contiguous pouches.

In light of the foregoing, it would be desirable to provide a pouch that is ergonomically designed to be easily handled and that is able to be produced, filled, and sealed on a form-fill-seal machine without generating appreciable, and preferably without generating any, scrap material between contiguous pouches.

SUMMARY OF THE INVENTION

The shortcomings of the known pouches are overcome, at least to a large extent, by pouches in accordance with the present invention. In particular, the pouches of the present invention are contoured in shape and, thereby, are easy to hold. Additionally, the pouches in accordance with the present invention can be produced, filled, and sealed on a form-fill-seal machine without generating scrap material between contiguous pouches.

In accordance with one embodiment of the invention, a package comprises two portions of flexible sheet material (which can be two separate webs, or a single web folded in the middle) arranged in opposing relation and sealed together along edges of the sheet material to form a sealed interior space in the package. The edges include opposite first and second lateral edges, wherein the first lateral edge comprises linear segments connected end-to-end and alternately inclined in opposite directions such that the first lateral edge is generally zigzag-shaped. The second lateral edge comprises linear segments respectively opposite from and substantially parallel to the linear segments of the first lateral edge such that the second lateral edge is generally zigzag-shaped. As a result, the first and second lateral edges are substantially complementary in shape to each other such that the package as a whole has a zigzag shape.

In one embodiment, the package is manufactured in a form-fill-seal process from continuous flexible sheet material such that a series of packages are connected lateral edge-to-lateral edge. Each of the first and second lateral edges is formed by cutting apart two adjacent packages along a zigzag-shaped line without removing waste material between the connected lateral edges, whereby the first and second lateral edges of the package are completely complementary in shape to each other.

The package can include a pour spout or drinking straw defined by a channel in a sealed edge of the package, the channel connecting with the interior space of the package. An easy-open feature can be included for opening the pour spout or drinking straw.

In some embodiments of the invention, the package comprises a stand-up pouch, having a base for supporting the pouch in an upright position. The base can include a gusset.

In another of its aspects, the present invention relates to an apparatus for forming a pouch. The apparatus comprises a pouch-forming component for assembling the pouch. In one particular embodiment, the pouch-forming component forms a pouch from a single web of pouch-forming material. Bottom, top, and side sealing components are provided for sealing bottom, top, and lateral edges of the pouch, respectively. If desired, the top sealing component may comprise a pour spout-forming section for forming a pour spout near the top edge of the pouch. The side sealing component is configured to provide a pouch with a lateral edge that is zigzag-shaped. In one particular embodiment, the side sealing component comprises a zigzag-shaped sealing surface. The side sealing component also optionally comprises a rib-forming portion for forming lateral edges having ribbed sections. The apparatus also includes a filling component for filling the pouch with a fill material and a cutting component for cutting the lateral edge between contiguous pouches. The cutting component comprises a cutting knife defining a zigzag-shaped cutting edge.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figures 1, 2:
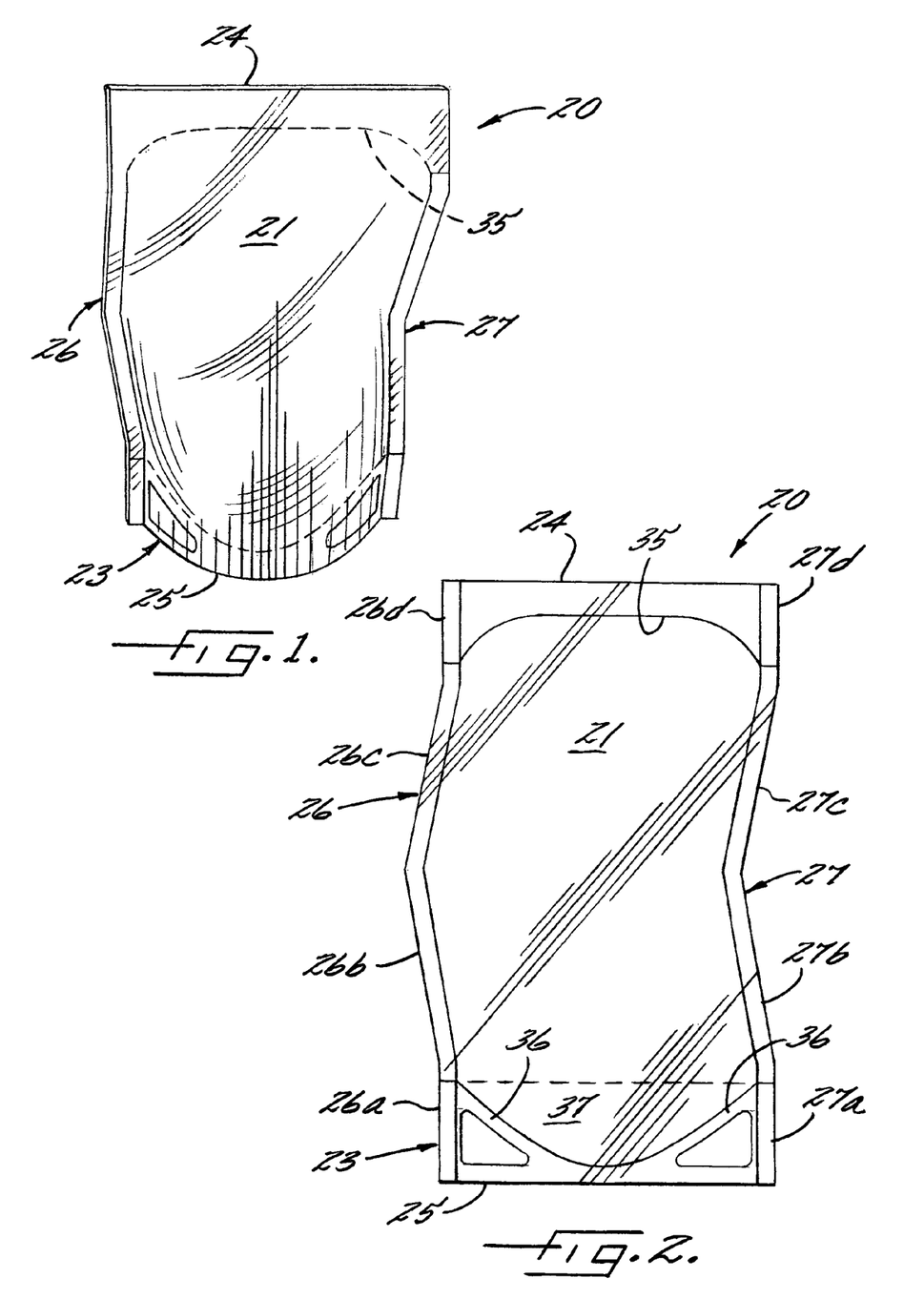
FIG. 1 is a perspective view of a zigzag-shaped package in accordance with a first embodiment of the invention.
FIG. 2 is a front elevation of the package of FIG. 1.
Figure 3:
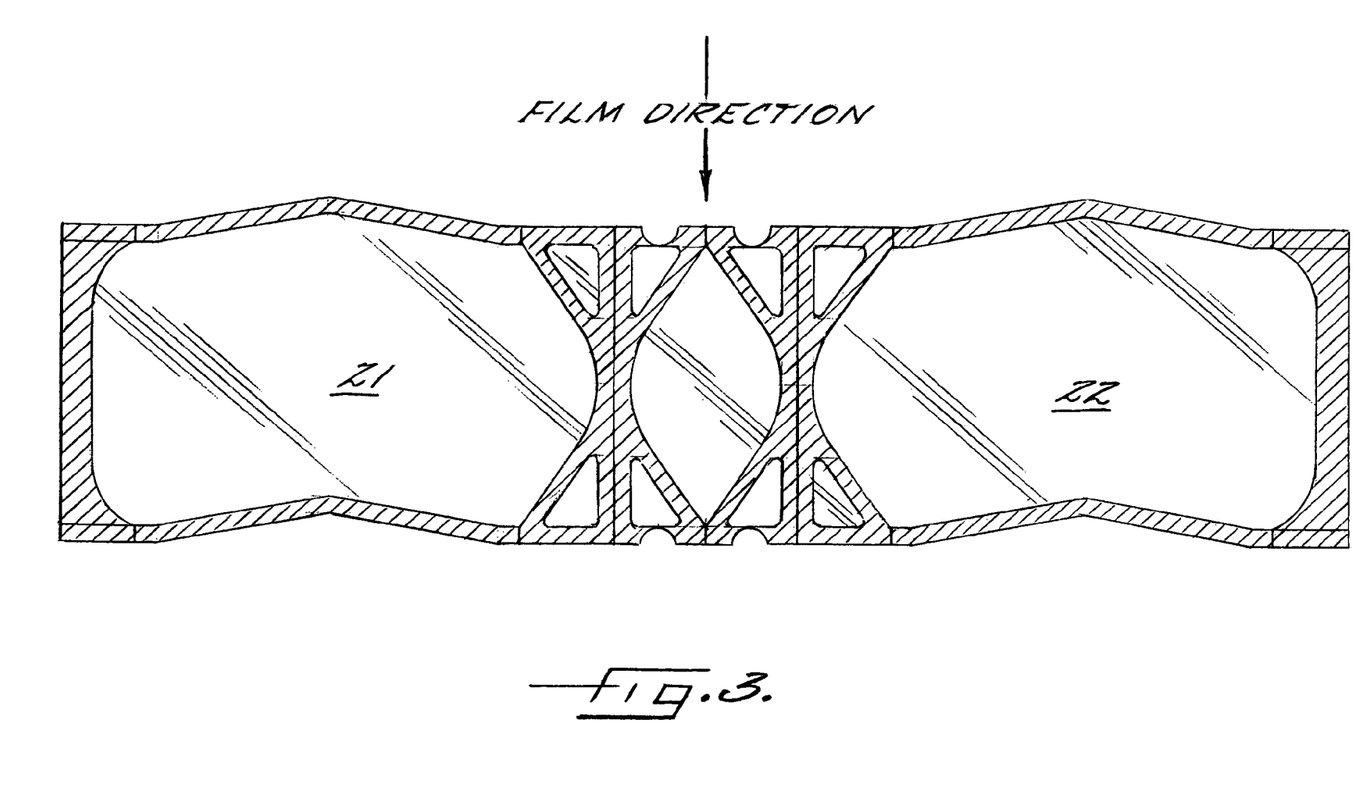
FIG. 3 is a top elevation of a packaging web for making the package of FIG. 1, in an unfolded condition.
Figure 4:
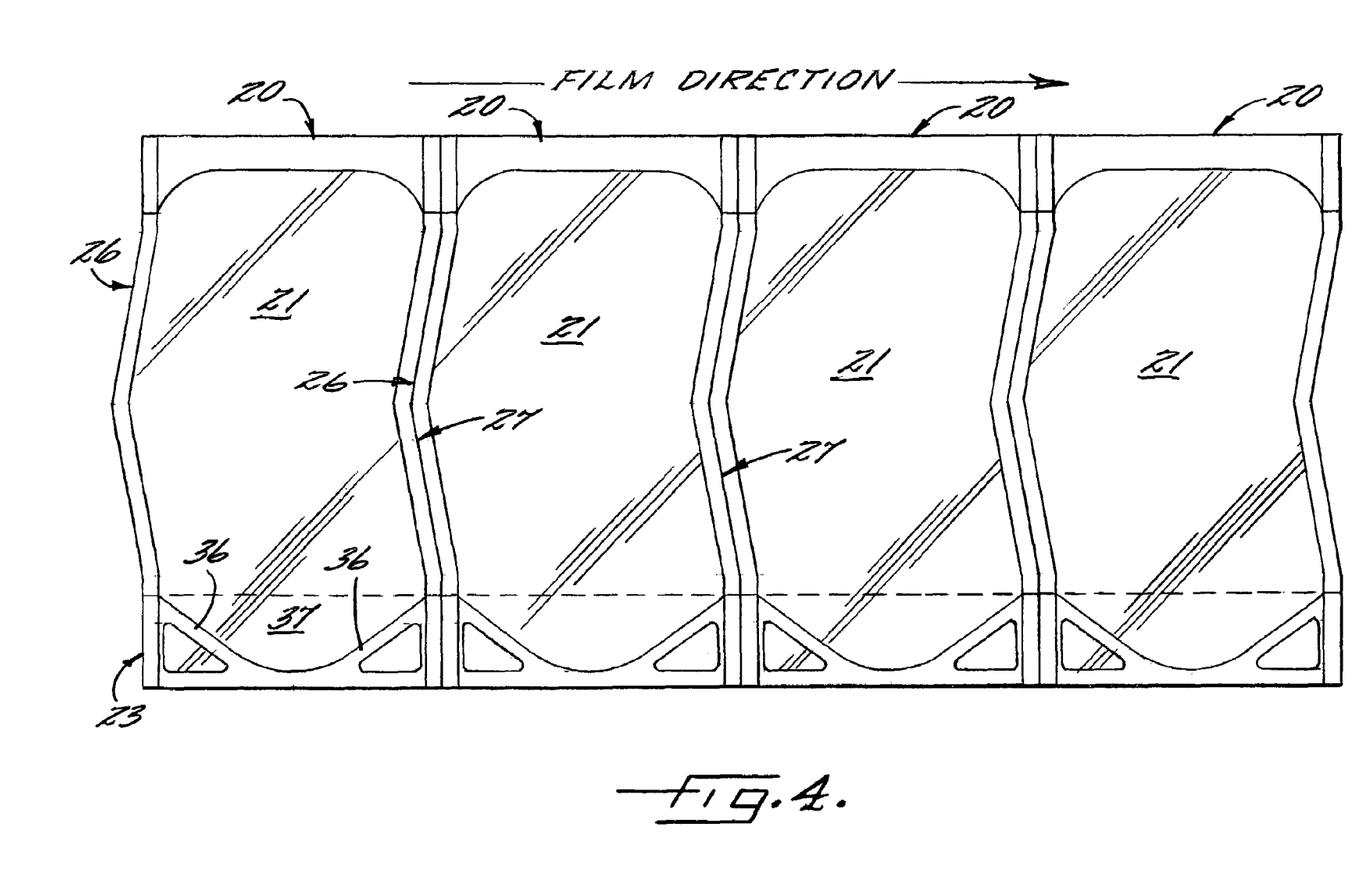
FIG. 4 illustrates a series of consecutive packages of the first embodiment connected together as a continuous web.

A pouch in accordance with one embodiment of the present invention is depicted in FIGS. 1 and 2, and a packaging web from which the pouch is produced is shown in FIG. 3. FIG. 4 shows a series of the pouches connected together as a continuous string or web. The pouch 20 comprises a front panel 21, a rear panel 22, and an optional gusset 23. The optional gusset 23 is provided to produce a free-standing pouch. Each of the front and rear panels has a top edge, a bottom edge, a left lateral edge or margin, and a right lateral edge or margin. The front and rear panels are generally arranged such that each edge of one panel is substantially aligned with the corresponding edge of the other panel. Accordingly, the front and rear panels 21, 22 are arranged to produce the pouch 20 with a top edge 24, a bottom edge or edges 25, a left lateral edge or margin 26, and a right lateral edge or margin 27.

The left and right lateral edges 26, 27 of the pouch 20 are contoured. As shown, each of the left and right lateral edges 26, 27 is generally zigzag-shaped. In particular, the left lateral edge 26 is made up of four linear segments 26a, 26b, 26c, and 26d, connected end-to-end. The linear segments are alternately inclined in opposite directions so as to form a zigzag-shaped edge. Similarly, the right lateral edge 27 is made up of four linear segments 27a, 27b, 27c, and 27d, alternately inclined in opposite directions and connected end-to-end to form a zigzag-shaped edge. The linear segment 26a of the left lateral edge is substantially opposite from and parallel to the linear segment 27a of the right lateral edge. Each of the other segments 26b–d is likewise substantially opposite from and parallel to a corresponding one of the segments 27b–d. As a result, the pouch 20 as a whole has a zigzag shape. Additionally, it will be appreciated by those skilled in the art that a distance between the left and the right lateral edges 26, 27 is substantially the same for all elevations of the pouch 20.

The linear segments 26a and 27a are located at the bottom of the pouch and are substantially perpendicular to the bottom edge(s) 25. These linear segments thereby enhance the stability of the pouch when the pouch is filled and in its upright position. However, alternatively the segments 26a and 27a could be at non-perpendicular angles to the bottom edge of the pouch.

The front panel 21, rear panel 22, and gusset 23 can be formed from any of a variety of films, laminates, or web materials, so long as the material is suitably flexible and capable of providing sufficient structural integrity. For example, the front panel 21, rear panel 22, and gusset 23 can be manufactured out of paper, paper composites, metallic films, co-extruded polymer films (such as FS-5150 and FS-5050 available from Cryovac/Sealed Air Corporation, Duncan, S.C.), or laminated polymer films. In one embodiment, the front panel 21, rear panel 22, and gusset 23 are formed from a polyolefinic material having a thickness of between about 0.001 and about 0.01 inches (0.025–0.25 mm), and preferably between about 0.003 and about 0.006 inches (0.076–0.152 mm).

The front panel 21, rear panel 22, and gusset 23 are sealed along the top, bottom, and lateral edges 24, 25, 26, 27 to form an inner cavity 35. In order to provide a base for the pouch 20, portions 36 of the gusset 23 are sealed to the front and rear panels 21, 22. As shown in FIG. 2, and as further described below in connection with FIG. 8, the portions 36 of the gusset 23, which are sealed to the front and rear panels 21, 22, present a generally arcuate seal to the interior of the inner cavity 35 of the pouch 20. When the pouch 20 is filled and placed in an upright position, an unsealed portion 37 of the gusset 23 can deform to form the bottom of the inner cavity 35 of the pouch 20, as best shown in FIG. 1. The inner cavity 35 is capable of holding a variety of materials, including low viscosity fluids (such as water, juice, and soda), high viscosity fluids (such as condiments and sauces), fluid/solid mixtures (such as soups), gels, powders, and pulverulent materials. Sealing can be accomplished using any of a variety of conventional methods, including the use of conventional adhesives and/or heat sealing. Further, the seals produced can be either smooth or ribbed, as described in more detail below.

Figure 5:
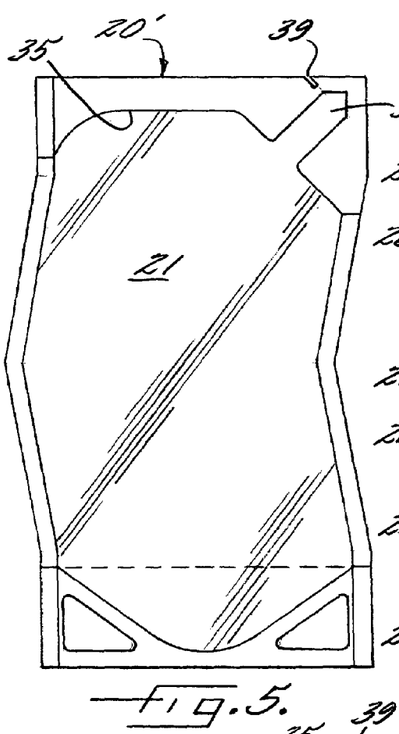
FIG. 5 is a front elevation of a zigzag-shaped package in accordance with a second embodiment of the invention.

FIG. 5 shows a second embodiment of a pouch 20' in accordance with the invention. The pouch 20' is generally the same as the pouch 20 previously described, except a pour spout or drinking straw 38 is defined at the top end of the pouch adjacent one corner. The spout/straw 38 is formed as a channel that connects with the interior cavity 35 of the pouch and extends outwardly partway toward the corner of the pouch, terminating at a closed end; the channel comprises an unsealed area where the front and back panels of the pouch are not sealed together. A tear feature, such as a slit 39 in the web material or the like, advantageously is formed adjacent the spout/straw 38 to facilitate opening the spout/straw by tearing off a portion of the web material so as to remove the closed end of the channel. Although only one spout/straw is shown, a pouch in accordance with the invention could have more than one spout/straw (e.g., one at each of the two top corners) if desired.

Figure 6:
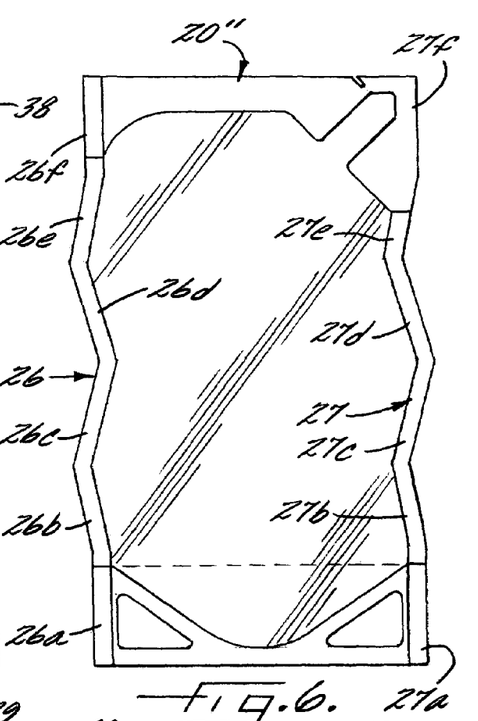
FIG. 6 is a front elevation of a zigzag-shaped package in accordance with a third embodiment of the invention.

FIG. 6 depicts a third embodiment of a pouch 20" in accordance with the invention. The pouch 20" is generally the same as the pouch 20' of FIG. 5, except for the configuration of the zigzag edges of the pouch. More particularly, the left edge 26 of the pouch 20" is made up of six linear segments 26a–f that are alternately inclined in opposite directions to form a zigzag-shaped edge; similarly, the right edge 27 is made up of six linear segments 27a–f that are alternately inclined in opposite directions to form a zigzag-shaped edge. The linear segment 26a of the left lateral edge is substantially opposite from and parallel to the linear segment 27a of the right lateral edge. Each of the other segments 26b–f is likewise substantially opposite from and parallel to a corresponding one of the segments 27b–f. As a result, the pouch 20" as a whole has a zigzag shape. Additionally, it will be appreciated by those skilled in the art that a distance between the left and the right lateral edges 26, 27 is substantially the same for all elevations of the pouch 20".

The invention is not limited to any particular number of linear segments making up each lateral edge of the package. On the other hand, it will be understood that the number should be relatively small if the package as a whole is to have a zigzag shape; thus, if the number of linear segments is too large, the edges take on merely a "sawtooth" appearance, and the package as a whole does not appear to be zigzag-shaped. Accordingly, it is generally preferred that the number of linear segments of each edge be no greater than 10, more preferably no greater than eight.

At the same time, the number of linear segments may be limited on the low end by practical considerations; although a minimum of two linear segments is necessary to impart a zigzag shape to the package, with only two segments it may be difficult to achieve a configuration that stands up stably, in the case of stand-up pouches such as those described thus far. Thus, the pouches 20, 20', and 20" have linear segments 26a, 27a adjacent the bottom of the pouches that are substantially perpendicular to the bottom edge(s) of the pouch, which improves stand-up stability of the pouches. If such perpendicular bottom segments were used in a pouch having only two linear segments, the center of gravity of the top portion of the pouch would not be in vertical alignment with the center of gravity of the bottom portion of the pouch, which is undesirable for stand-up stability. Accordingly, it is generally preferred that each lateral edge of any stand-up pouch in accordance with the invention be made up of at least three linear segments. In the case of packages that do not have to stand up, however, as few as two linear segments can be used.

Thus, packages in accordance with the invention suitably can have from two to about 10 linear segments making up each zigzag-shaped edge, but more preferably can have three to eight linear segments. The packages illustrated herein have from four to six segments.

Figure 7:
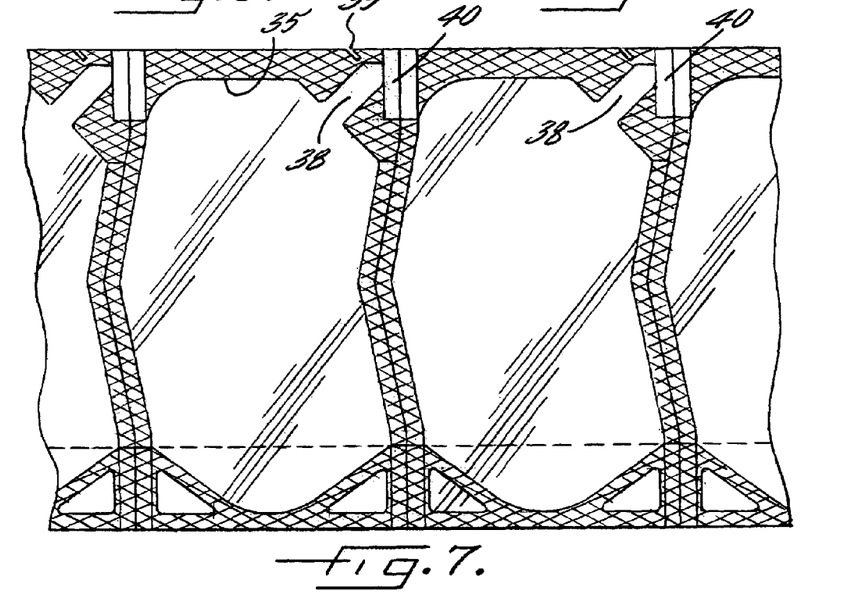
FIG. 7 illustrates a fourth embodiment of the invention.

FIG. 7 illustrates that pouches having a pour spout or drinking straw can have seals that are ribbed, as indicated by cross-hatching in the drawing. In the vicinity of the spout/straw 38, on the opposite side thereof from the tear feature or slit 39, the seal can have a region 40 that is non-ribbed or smooth. The slit 39 and the non-ribbed section 40 of the seal cooperate to allow the corner of the pouch to be torn or removed to open the spout/straw while preventing the tear from exposing the inner cavity 35 of the pouch.

Figures 8, 8A, 8B:
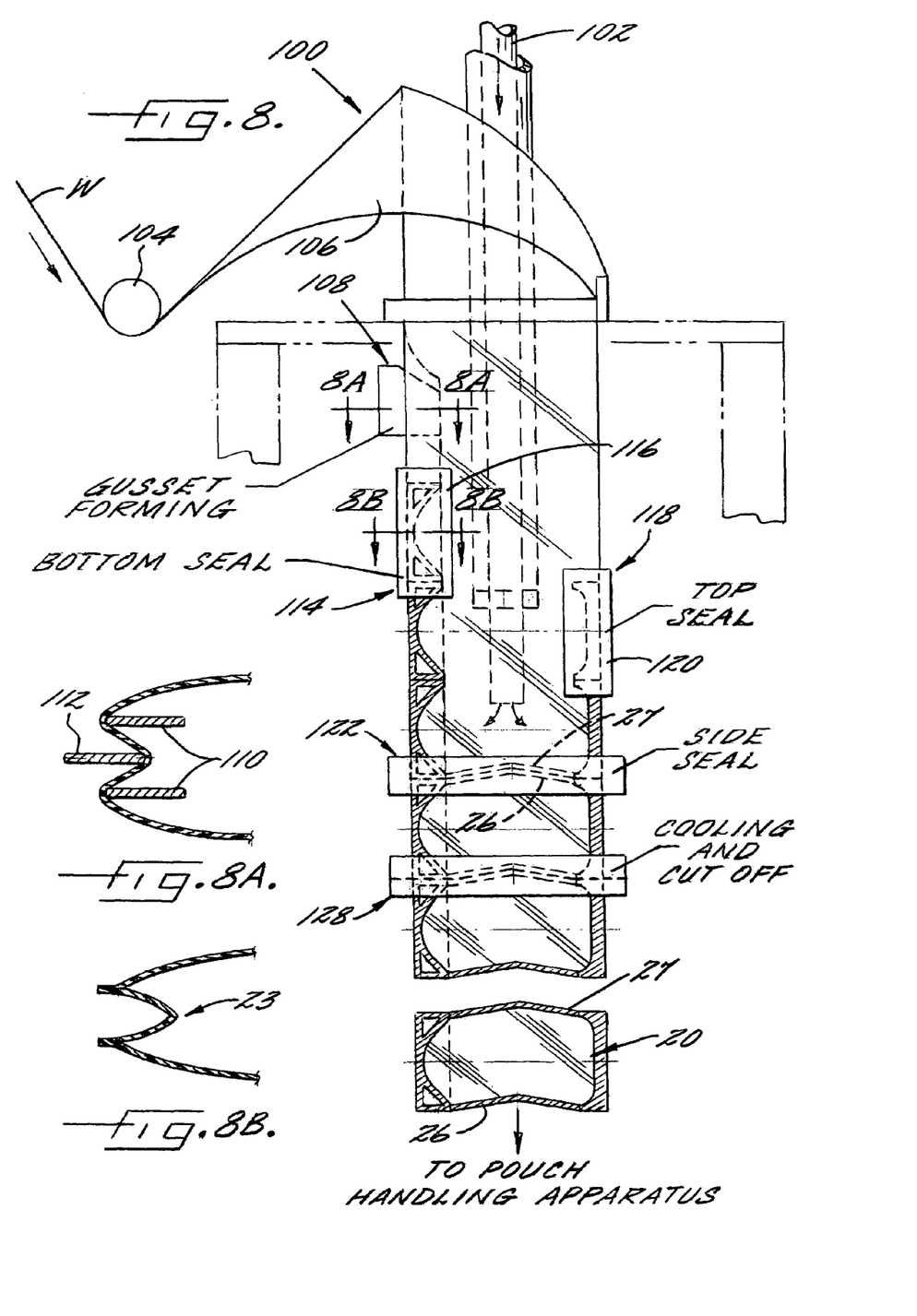
FIG. 8 schematically depicts an apparatus for making packages in accordance with the invention.
FIG. 8A is a cross-sectional view along line 8A—8A in FIG. 8, depicting an operation for folding the web material to make a bottom gusset in the packages.
FIG. 8B is a cross-sectional view along line 8B—8B in FIG. 8, showing the completed bottom gusset of a package.

Packages in accordance with the invention advantageously are made using automated web-handling equipment that forms the packages, fills them, and seals them closed, such as a form-fill-seal machine. The seals advantageously are formed by heat-sealing the web, and the web accordingly is formed to include suitable heat-sealing material on its inner surface. FIG. 8 schematically illustrates one possible apparatus for forming packages such as those previously described, comprising a form-fill-seal machine. The apparatus 100 includes a fill tube 102 through which product, for example a liquid product, is supplied for filling the formed packages. A web W of packaging material is drawn from a web supply (not shown) and advanced toward the fill tube 102 by suitable web-handling elements 104. The web is manipulated by a forming guide 106 into a generally C-shape or tubular shape around the fill tube 102 such that the fill tube extends through the interior of the tubular-shaped web. Thus, one portion of the web W that will form the front panels (see front panel 21 in FIG. 3) of packages is in generally overlying relation with another portion of the web that will form the rear panels (see rear panel 22 in FIG. 3) of the packages, and the fill tube is positioned between these two portions of the web.

The web is operated upon at a gusset-forming station 108 that folds the web into a generally W-shaped configuration at the juncture between the two overlying portions of the web. FIG. 8A shows the gusset-forming operation in greater detail. Two spaced members 110 are positioned between the two overlying web portions and a third member 112 is positioned on the exterior of the web between the two members 110. The exterior member 112 tucks the web inwardly between the two interior members 110 to form the W-shaped region that will become a gusset.

Next, the web is operated upon at a bottom-sealing station 114 that includes a pair of opposed bottom seal bars 116 (only one visible in FIG. 8) and a member (not shown, but can be an extension of the member 112 of the gusset-forming station) that is disposed between the two vertices of the W-shaped gusset to prevent the vertices from being heat-sealed to each other when the heat-seal bars come together to apply heat and pressure to the two overlying portions of the web to form a bottom seal of a package. The resulting bottom seal and gusset 23 is shown in cross-section in FIG. 8B. The bottom seal has the configuration shown by the hatch marks in FIG. 8; the seal configuration is dictated by the configuration of the sealing surfaces of the bottom heat-seal bars 116, and various configurations can be used in the practice of the invention.

Next, the web is operated upon at a top-sealing station 118 that includes a pair of opposed top seal bars 120 (only one visible in FIG. 8). The bars 120 come together to apply heat and pressure to the two overlying portions of the web to seal the portions together, thus forming a top seal for the package. The top seal has the configuration shown by the hatch marks in FIG. 8; the seal configuration is dictated by the configuration of the sealing surfaces of the top heat-seal bars 120, and various configurations can be used.

The bottom-sealing station and top-sealing station operate intermittently on successive lengthwise portions of the continuous web. Accordingly, the web is advanced intermittently to bring the successive lengthwise portions of the web into alignment with the bottom-sealing station and the top-sealing station, and the web is brought to a halt to allow these sealing operations to occur; the web is then advanced again by an indexing distance preferably equal to one package width (i.e., the distance from the left lateral edge 26 to the right lateral edge 27 of a package), brought to a halt, and the sealing operations recur. In FIG. 8, the bottom-sealing station 114 and top-sealing station 118 are not aligned but rather are staggered so that while the bottom-sealing station 114 is forming a bottom seal of one package, the top-sealing station 118 is forming a top seal of a previous package spaced one package width downstream of the bottom-sealing station. Alternatively, the bottom- and top-sealing stations could be aligned at the same location along the path of travel of the web so that they simultaneously form the top and bottom seals of the same package. In either case, the end result is a series of lengthwise web portions connected to each other, each having a width equal to a desired width of finished packages and each having a top seal and a bottom seal.

At each of the top-sealing and bottom-sealing stations, the opposed seal bars can comprise a heat-seal bar that has raised, heated seal surfaces (which can be smooth or textured, e.g., with ribs or the like, as further described below) in the desired configuration of the seal to be produced, and a backing bar that has raised surfaces (which are generally smooth) in the same general configuration as the surfaces of the heat-seal bar. The heat-seal bars can be made from various materials, including but not limited to aluminum, brass, or steel, and optionally can include a non-stick coating such as polytetrafluoroethylene (e.g., TEFLON®). The raised portions of the backing bars advantageously can include a resiliently elastic surface to ensure uniform contact between the seal bar and corresponding backing bar. For instance, the raised portions of the backing bar can have a vulcanized rubber face; they can also be provided with a non-stick surface, such as a tape-like material of TEFLON® or the like applied to the working surfaces. The tape typically lasts for a relatively short period of time and must be replaced periodically.

Figures 9A, 9B:
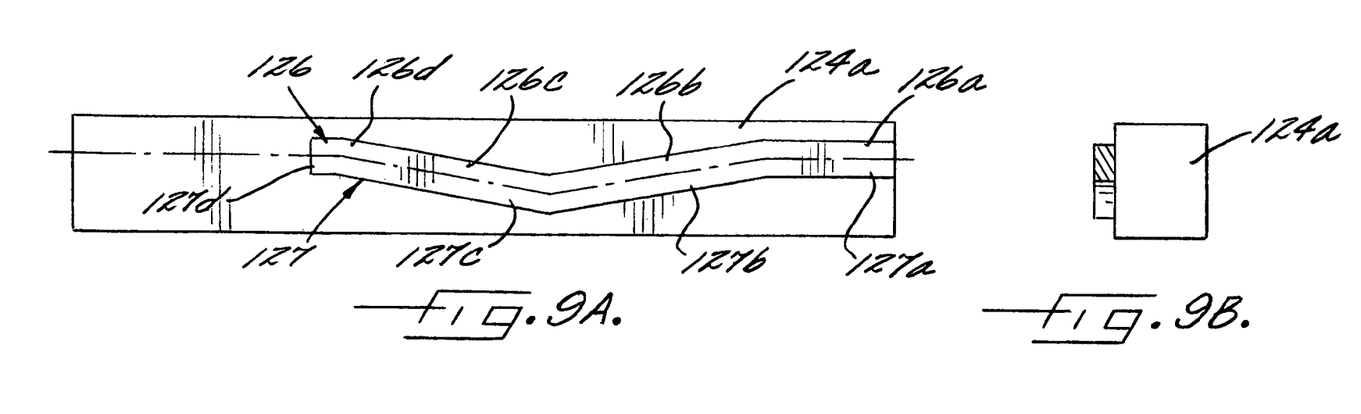
FIG. 9A is a top elevation of a first side seal bar of the apparatus.
FIG. 9B is a cross-sectional view through the first side seal bar.
Figure 10A:
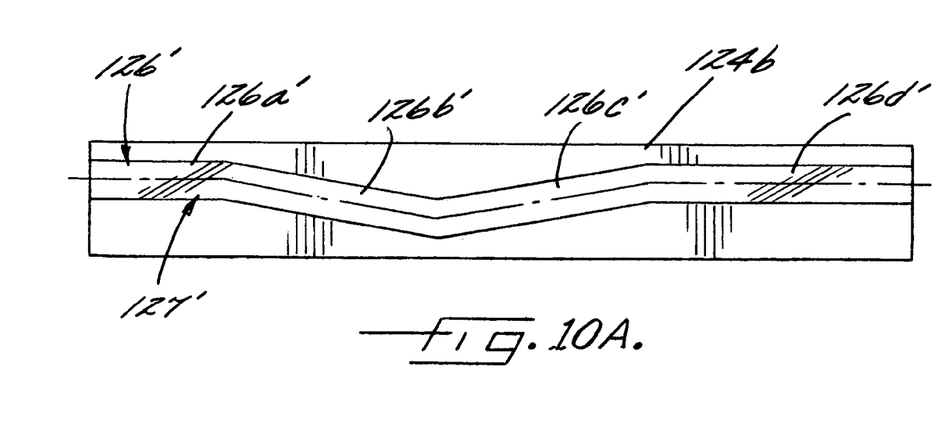
FIG. 10A is a top elevation of a second side seal bar that works in conjunction with the first side seal bar.
Figure 10B:
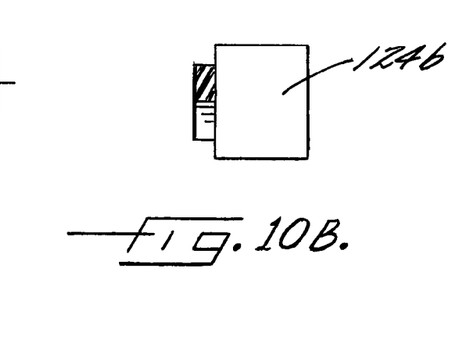
FIG. 10B is a cross-sectional view through the second side seal bar.
Figure 11A:
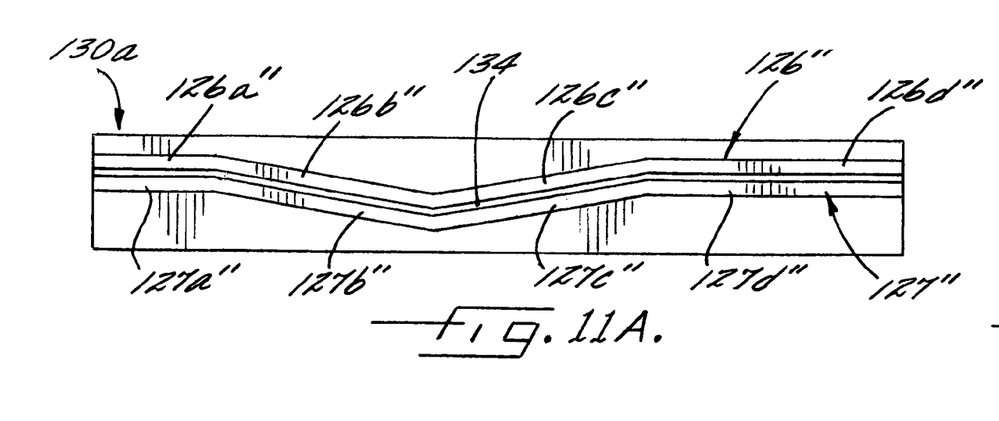
FIG. 11A is a top elevation of a cut-off bar of the apparatus.
Figure 11B:
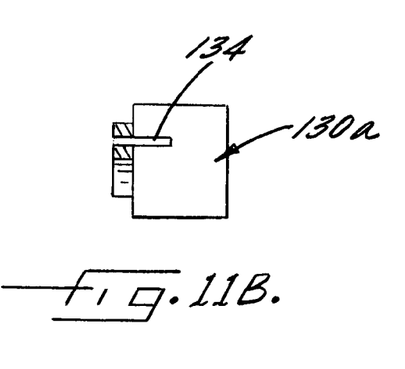
FIG. 11B is a cross-sectional view through the cut-off bar.
Figure 12A:
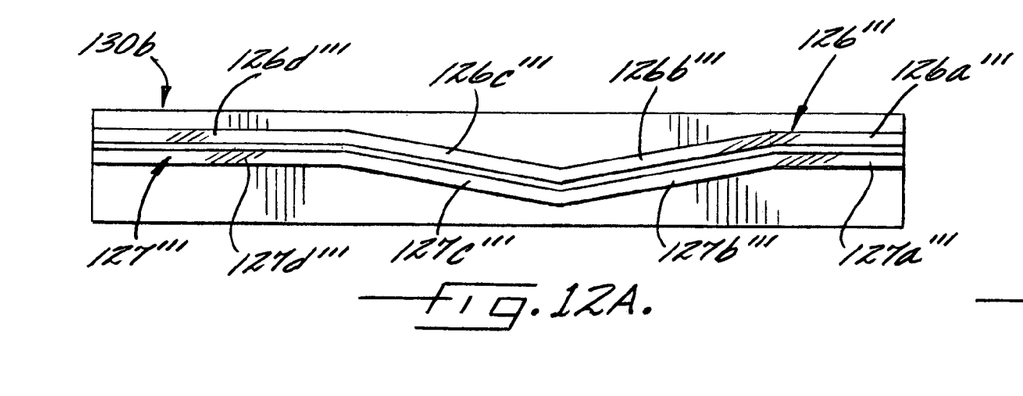
FIG. 12A is a top elevation of a cooling bar that works in conjunction with the cut-off bar.
Figure 12B:
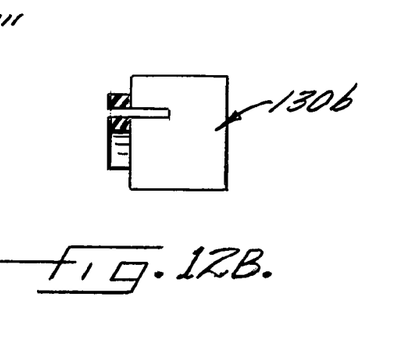
FIG. 12B is a cross-sectional view through the cooling bar.

After the top and bottom seals are formed, the web is operated upon at a side-sealing station 122 that includes a pair of opposed bars including a side heat-seal bar 124a and a backing bar 124b. One possible configuration of the side heat-seal and backing bars is depicted in FIGS. 9A and 10A, respectively showing the bars 124a and 124b. The heat-seal bar 124a has raised sealing surfaces 126 and 127 (smooth or textured) and the cooperating backing bar 124a has raised surfaces 126' and 127' generally corresponding to the sealing surfaces of the heat-seal bar. The side heat-seal and backing bars can be constructed from materials similar to those previously described for the top and bottom heat-seal and backing bars. The raised surfaces 126 and 126' cooperate to form the lateral side seal along the edge 26 of one package, and the sealing surfaces 127 and 127' cooperate to form the lateral side seal along the opposite edge 27 of the package just upstream; the two packages are connected to each other at the respective edges 26 and 27.

Advantageously, in accordance with the invention, there is no waste material between two such contiguous packages, as further described below. Accordingly, although the raised sealing surfaces 126 and 127 of the bar 124a, and the corresponding raised surfaces 126' and 127' of the backing bar 124b, are described separately and given separate reference numbers for clarity of explanation, in reality the sealing surfaces 126 and 127 are two parts of one continuous sealing surface; the broken line dividing the surfaces 126 and 127 in FIG. 9A is imaginary. Similarly, the surfaces 126' and 127' are parts of one continuous surface.

The sealing surfaces of the heat-seal bar 124a are made up of a plurality of linear segments alternately inclined in opposite directions to form a zigzag-shaped surface. Thus, the surface 126 is composed of linear segments 126a–d, which correspond to the linear segments 26a–d of the left lateral edge 26 of the package shown in FIG. 2. The surface 127 is composed of linear segments 127a–d, which correspond to the linear segments 27a–d of the right lateral edge 27 of the package of FIG. 2. Similarly, the surface 126' of the backing bar 124b is composed of linear segments 126a'–d', which correspond to the linear segments 26a'–d' of the left lateral edge 26 of the package, and the surface 127' is composed of segments 127a'–d', which correspond to the linear segments 27a'–d' of the right lateral edge 27 of the package.

The sealing surfaces of the side heat-seal bar can be smooth. Alternatively, the surfaces can be ribbed for producing ribbed seals. Ribbed seals in some instances may be preferred over smooth seals. For example, when the package is to contain fluid of relatively high viscosity, or a substance having solid parts, any fluid or solids that might become trapped between the front and rear panels of the package are pushed out of the way by the raised ribs of the sealing surfaces during sealing so they do not interfere with the sealing process. Furthermore, the ribbed seals can provide added rigidity to the package, which can be desirable, particularly in the case of a stand-up pouch.

The side-sealing station 122 is located just below the bottom of the fill tube 102. Once the side-sealing station 122 forms the side seals, the package whose leading edge 27 is located at the side-sealing station then has top and bottom seals and one side seal, and the remaining fourth side of the package is open and is located at the top of the package. Next, the supply system for the product (not shown) causes product to be supplied through the fill tube 102 to fill the package, as indicated by the arrows in FIG. 8.

This package is then indexed to a cooling and cut-off station 128. The station 128 includes a cut-off bar 130a and a cooling bar 130b shown in detail in FIGS. 11A, 11B, 12A, and 12B. The cut-off bar 130a defines surface 126" composed of linear segments 126a"–d", and surface 127" composed of linear segments 127a"–d". The cooling bar 130b similarly defines cooling surface 126'" composed of linear segments 126a'"–d'", and cooling surface 127'" composed of linear segments 127a'"–d'". The cooling bar 130b defines coolant passages (not shown) internally within the bar for circulating a coolant through the bar so that the cooling surfaces of the bar are cooled to a reduced temperature relative to what the temperature would be without cooling. The cut-off and cooling bars come together so that the web material is squeezed between the surfaces of the bars; the respective cooling surfaces of the cooling bar align with the seals formed by the sealing surfaces of the side seal bars 124a,b, and cool the seals so that the heat-sealing material on the web material is substantially solidified, thereby strengthening the seals. The raised surfaces of the cut-off bar can be formed of various materials including but not limited to aluminum, brass, or steel, and can be coated with a non-stick coating. The raised surfaces of the cooling bar can be formed of any of the metals described above and can have a vulcanized rubber face; optionally they also can have a non-stick surface, such as a TEFLON® tape as previously noted.

Figure 13A:
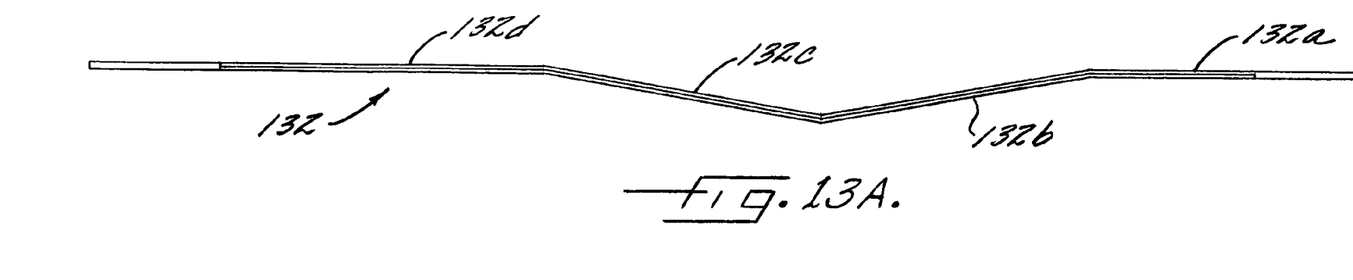
FIG. 13A is a top elevation of a cut-off knife of the apparatus.
Figure 13B:
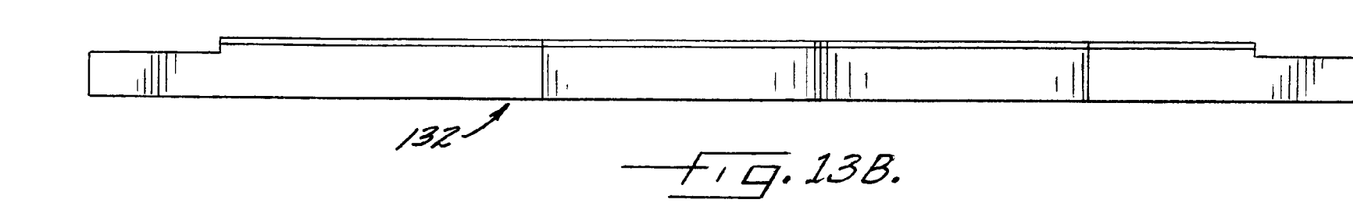
FIG. 13B is a side elevation of the cut-off knife.
Figure 14:
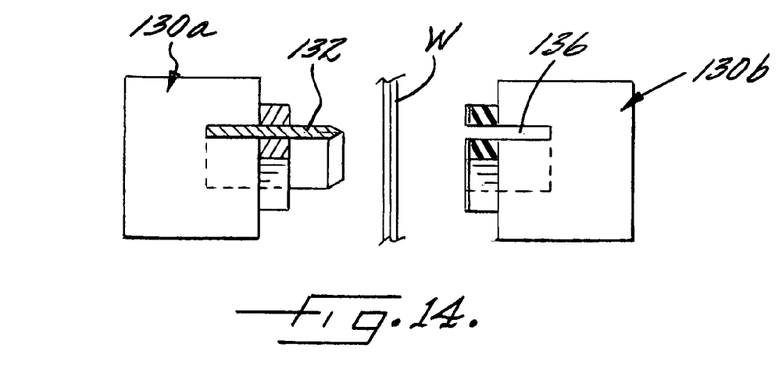
FIG. 14 illustrates the cooling and cut-off bars and knife in operation.

The cooling and cut-off station also includes a cut-off knife 132 for severing the web material along a zigzag-shaped line at the juncture between the edge 26 of one package and the edge 27 of the adjacent package, so that there is no waste material removed in the severing process. With reference to FIGS. 13A and 13B, the cut-off knife has a zigzag shape. The cutting edge of the knife is made up of linear segments 132a–d that correspond to the linear segments of the seal bars 124a,b. The cut-off bar 130a defines a slot or groove 134 (FIGS. 11A and 11B) in which the knife 132 is disposed. The knife is movable within the slot 134 by a suitable actuator (not shown) between a withdrawn position and an extended position. In the withdrawn position, the cutting edge of the knife is retracted within the slot 134; in the extended position as shown in FIG. 14, the cutting edge of the knife projects out from the slot. The cooling bar 130b also defines a slot 136 for receiving the cutting edge of the knife when the knife is actuated to the extended position. Although FIG. 14 shows the knife 132 in the extended position prior to the bars 130a,b coming together to squeeze the web therebetween, in reality the knife is held in the retracted position until the bars come together, and then the knife is actuated to sever the web material. In this manner, a completed package 20 is detached from the web material as shown in FIG. 8. The package has zigzag-shaped edges 26, 27 on account of the zigzag configurations of the seal bars and the cooling and cut-off bars and cut-off knife. No waste material is removed between two adjacent packages and accordingly the edge 27 of one package and the adjacent edge 26 of the next package are completely complementary in shape. As a result, the package as a whole has a zigzag shape.

Although the apparatus and process described above entail the production of packages from a single web that is folded to create the front and rear panels of the packages, the invention can alternatively entail the use of separate webs to form the front and rear panels; where the package includes a gusset, the gusset can be formed from a separate web.

Furthermore, the top, bottom, and side seals can be made in any order. Additionally, the invention is applicable to various types of machines and processes, including vertical and horizontal form-fill-seal machines and processes. Packages in accordance with the invention can be produced as stand-up pouches or as other types of packages such as those generally referred to as pillow packages, and others.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible package comprising:
    two portions of flexible sheet material arranged in opposing relation and sealed together along edges of the sheet material to form a sealed interior space in the package, said edges including opposite first and second lateral edges, wherein the first lateral edge comprises linear segments connected end-to-end and alternately inclined in opposite directions such that the first lateral edge is generally zigzag-shaped, the second lateral edge comprising linear segments equal in number to the segments of the first lateral edge and respectively opposite from and substantially parallel to the linear segments of the first lateral edge such that the second lateral edge is generally zigzag-shaped, wherein each lateral edge has from 3 to 8 linear segments, whereby the first and second lateral edges are substantially complementary in shape to each other such that the package as a whole has a zigzag shape.

2. The flexible package of claim 1, wherein the package is manufactured in a form-fill-seal process from continuous flexible sheet material such that a series of said packages are connected lateral edge-to-lateral edge, and wherein each of the first and second lateral edges is formed by cutting apart two adjacent packages along a zigzag-shaped line without removing waste material between the connected lateral edges, whereby the first and second lateral edges of the package are completely complementary in shape to each other.

3. The flexible package of claim 1, wherein the package comprises a stand-up pouch, having a base for supporting the pouch in an upright position.

4. The flexible package of claim 3, wherein the base includes a gusset.

5. The flexible package of claim 1, wherein each lateral edge has from 4 to 6 linear segments.

6. A flexible package comprising:
    two portions of flexible sheet material arranged in opposing relation and sealed together along edges of the sheet material to form a sealed interior space in the package, said edges including opposite first and second lateral edges, wherein the first lateral edge comprises linear segments connected end-to-end and alternately inclined in opposite directions such that the first lateral edge is generally zigzag-shaped, the second lateral edge comprising linear segments respectively opposite from and substantially parallel to the linear segments of the first lateral edge such that the second lateral edge is generally zigzag-shaped, whereby the first and second lateral edges are substantially complementary in shape to each other such that the package as a whole has a zigzag shape, and further comprising a pour spout defined by a channel in a sealed edge of the package, the channel connecting with the interior space of the package.

7. The flexible package of claim 6, further comprising a tear feature arranged proximate the pour spout, the tear feature facilitating tearing of the sheet material for opening the pour spout.

8. The flexible package of claim 7, wherein said sealed edge defining the pour spout has a ribbed seal portion and a non-ribbed seal portion, the non-ribbed seal portion being arranged on an opposite side of the pour spout from the tear feature.

* * * * *